United States Patent

Satake et al.

[11] Patent Number: 5,796,233

[45] Date of Patent: *Aug. 18, 1998

[54] MULTIPLE-STATOR INDUCTION SYNCHRONOUS MOTOR

[75] Inventors: Toshihiko Satake, Higashihiroshima; Yukio Onogi, Hiroshima, both of Japan

[73] Assignee: Satake Engineering Co., Ltd., Tokyo, Japan

[*] Notice: The terminal 31 months of this patent has been disclaimed.

[21] Appl. No.: 849,078

[22] PCT Filed: Oct. 24, 1990

[86] PCT No.: PCT/JP90/01366

§ 371 Date: Jun. 24, 1992

§ 102(e) Date: Jun. 24, 1992

[87] PCT Pub. No.: WO91/07005

PCT Pub. Date: May 16, 1991

[30] Foreign Application Priority Data

| Oct. 27, 1989 | [JP] | Japan | 1-281380 |
| Jan. 9, 1990 | [JP] | Japan | 2-3082 |
| Mar. 7, 1990 | [JP] | Japan | 2-57487 |

[51] Int. Cl.$^6$ .................................................. H02P 4/14
[52] U.S. Cl. ............ 318/705; 318/712; 318/722; 318/778; 318/799; 318/820; 318/832
[58] Field of Search .................. 318/704–707, 318/709, 712–717, 719–721, 724, 772–773, 777–778, 798–799, 820, 830–832, 437, 541–542

[56] References Cited

U.S. PATENT DOCUMENTS

| 3,280,400 | 10/1966 | Roe | 318/437 X |
| 4,038,588 | 7/1977 | Heyne et al. | 318/713 X |
| 4,503,377 | 3/1985 | Kitabayashi et al. | 318/832 X |
| 4,785,213 | 11/1988 | Satake et al. | 318/437 X |
| 4,866,364 | 9/1989 | Chiarion | 318/704 |
| 4,931,715 | 6/1990 | Lee et al. | 318/709 |

*Primary Examiner*—William M. Shoop, Jr.
*Assistant Examiner*—Brian Sircus
*Attorney, Agent, or Firm*—Fish & Richardson P.C.

[57] ABSTRACT

An induction synchronous motor comprises: a unitary rotor having a first and a second rotor core; a first and a second stator mounted surroundingly facing the first and the second rotor core; a voltage phase shifting means for producing a first and a second phase differences; a static magnetic field around each of the first and second rotor cores; and a rotor magnetizing means having diodes for rectifying alternating voltages and for having the resultant direct current produce magnetic poles in the first and second rotor cores. The motor is caused to initiate its operation as an induction motor based on the first phase difference produced by the voltage phase shifting means, to have the first phase difference shifted to the second phase difference produced by the phase shifting means operated, and to have the first and second rotor cores produce the magnetic poles attracted by the rotating magnetic field produced by the first and second stators, resulting in the synchronous operation of the motor.

6 Claims, 7 Drawing Sheets

MULTIPLE-STATOR INDUCTION SYNCHRONOUS MOTOR

FIELD OF THE INVENTION

The present invention relates to a synchronous motor and, more particularly, to an induction synchronous motor having a plurality of stators.

BACKGROUND OF THE INVENTION

Generally, a synchronous motor requires a starter for having its rotor accelerated up to a rotation speed of a rotating magnetic field produced by stator windings and also a means for effecting direct current magnetic excitation for rotor windings.

An induction synchronous motor is one in which the starter is omitted but an arrangement is made such that the synchronous motor itself is provided with starting torque. Such a motor does not require a starter since rotor windings are short-circuitted for the motor to operate as an induction motor but brushes are required for the direct current magnetic excitation of the rotor windings which is indispensable for the synchronous operation. That is, as the rotating speed of the rotor approaches the synchronous speed, the short-circuitting of the rotor windings is removed so that the direct current flows from an external power supply source through the brushes thereby forming magnetic poles on the rotors. Such magnetic poles are attracted by the rotating magnetic fields produced in the stator windings and this causes the rotor to rotate in the synchronous speed. The brushes require checking and maintenance, which adds to an extra maintenance cost, so that there is a strong desire to develop brushless synchronous motors.

As conventional synchronous motors having brushless structures, those known include a permanent magnet type and a reluctance type motor but such motor is limited to one with only a small capacity since there are problems associated with a demagnetization factor or a low power factor. Also, such a synchronous motor as an inductor-type has a drawback in that the arrangements necessary for magnetic passages are unavoidably complicated thereby increasing the overall motor size. The same problem is true in a motor in which an alternate-current magnetic excitator and a rotary rectifier are used. Further, in a brushless three-phase synchronous motor of a self-excitation type in which a diode is connected to a rotor winding and a harmonic magnetic field is processed by a rectangular wave voltage of an invertor, a drawback is that a magnetomotive force of the rotor is insufficient so that no sufficient output can be obtained. Also known is a brushless three-phase synchronous motor of a self-excitation type. In such a motor, a diode is inserted in one phase of three-phase stator windings whereby a static magnetic field is superimposed over a positive phase component rotating magnetic field and an alternating current voltage due to the static magnetic field is induced in the rotor windings to rotate in the synchronous speed. By having the voltage thus induced rectified through a diode, the rotor winding is DC-excited and a positive phase component of magnetic field acts thereby producing a synchronous torque. However, a drawback in such a motor is that an inductor starting is impossible since the start is by eddy currents and the starting torque is small.

The technical problems to be solved are to provide a synchronous motor in which the starting torque and the synchronous torque are large and which does not require brushes thereby facilitating maintenance of the motor and does not require any such means as a starter thereby facilitating structural simplification of the motor.

SUMMARY OF THE INVENTION

In order to overcome such problems as explained above, the present invention provides an induction synchronous motor comprising:

- a unitary rotor having a first and a second rotor core mounted on a common rotary axis with a predetermined space being provided between the first and second rotor cores and a plurality of rotor conductive members provided on each of the first and second rotor cores;

- a first and a second stator mounted surroundingly facing the first and the second rotor core, respectively;

- a voltage phase shifting means for producing a second phase difference of 180° with respect to a first phase difference of 0° in an electric angle between a voltage induced in the rotor conductive member based on a rotating magnetic field produced around the first rotor core surroundingly faced by the first stator and a voltage induced in the rotor conductive member based on a rotating magnetic field produced around the second rotor core surroundingly faced by the second stator;

- a static magnetic field producing means for producing a static magnetic field around each of the first and second rotor cores; and

- a rotor magnetizing means formed in a unit with the rotor and having diodes for rectifying alternating voltages induced based on the static magnetic field produced by the static magnetic field producing means, the resultant direct current being caused to flow in each of the rotor conductive members to produce magnetic poles in the first and second rotor cores;

- whereby the motor is caused to initiate its operation as an induction motor based on the first phase difference produced by the voltage phase shifting means, to have the first phase difference shifted to the second phase difference produced by the phase shifting means, to have the static magnetic field producing means operated, and to have the first and second rotor cores produce the magnetic poles attracted by the rotating magnetic fields produced by the first and second stators, resulting in the synchronous operation of the motor.

FUNCTION

The inventors in the present patent application disclosed in Japanese Patent Application No. Sho 61-128,314 a detailed structure and function of a voltage phase shifting means of an induction motor having a plurality of stators.

The present invention provides in one form a motor comprising, on one hand, a unitary rotor having rotor windings connected parallelly with respective rotor windings wound on a plurality of rotor cores provided on a common rotary axis with a predetermined space between the rotor cores and having a diode connected between terminals of the rotor windings and, on the other hand, a plurality of stators having stator windings and direct current magnetic excitation circuits, and a voltage phase shifting means which causes the motor to function as an induction motor such that, at the starting of the motor, the voltages induced in the rotor windings by the rotating magnetic fields produced at the stator windings are to be of the same phase, that is, in the state in which the current flows circulating between the rotor windings and thus the current does not flow to diodes connected between the terminals of the rotor windings. As the rotation speed of the rotor increases after the starting of the motor and reaches near the rotation speed of the rotating magnetic fields, that is, the synchronous speed, the induction voltage of the rotor winding due to the rotating magnetic fields becomes small. So far the motor has been operating as an induction motor but, as the slip S approaches S=0.05, the motor enters into a synchronous operation. This is achieved by the operation as explained hereinafter.

First, the voltage phase shifting means is operated so as to produce a phase difference between a rotating magnetic field produced around one of the rotor cores surroundingly faced by a particular one of the plurality of stators and a rotating magnetic field produced around the other of the rotor cores surroundingly faced by the other one of the stators. In this state of the operation, the current which has been circulating through the rotor windings no longer circulates but instead flows through the diodes connected between the terminals of the rotor windings.

The current flowing to the rotor windings due to the rotating magnetic fields no longer flows when the rotor reaches its synchronous speed of the rotor and the slip becomes zero whereby no synchronous operation is possible any longer. Here, the direct current magnetic excitation circuit provided for the stators acts and causes to produce a static magnetic field whereby the rotor windings interlink with the static magnetic field and induce an alternating current voltage. This alternating current voltage increases as the rotation speed of the rotor increases.

The phase of the alternating voltage and the voltage phase shifting means are interlocked. Thus, when the alternating voltage is applied to the diodes connected between the terminals of the rotor windings, the current which is rectified flows to the rotor windings whereby the rotor core is caused to form magnetic poles and the unitary rotor rotates at the synchronous speed by being attracted by the rotating magnetic fields produced by the rotor windings.

As to the synchronous torque, although the phase shifting of one rotating magnetic field from the rotating magnetic field which is produced by the particular one of the stators is 180°, the direction of the current rectified through the diode and flowing to the rotor winding of the rotor surroundingly facing the particular stator due to the static magnetic field is opposite to that of the other rotor windings and this means that the synchronous torque is all in the same direction at the unitary rotor and that the overall torque is the sum of all such synchronous torque. Therefore, although the induction synchronous motor according to the present invention has a plurality of stators, the total capacity is the same as that of an ordinary induction synchronous motor having brushes.

As explained herein above, the motor according to the present invention generates a large torque at the starting operation since the motor starts on the principle of an ordinary induction motor thereby requiring no such other means as a starter. During the synchronous speed operation, the rotor windings function as direct current magnetic excitation windings resulting in the generation of a large synchronous torque without requiring any brushes and any maintenance associated thereto.

It is also possible to arrange that, instead of the direct current magnetic excitation circuit, a revolving armature having a rectifier circuit be provided on a rotary axis, a stator for DC magnetic excitation be provided surroundingly facing the revolving armature, and direct current outputs of the rectifier circuit be connected parallelly with the rotor windings whereby the DC magnetic excitation of the rotor windings enables to achieve the synchronous operation.

In the motor having a unitary rotor comprising a plurality of rotor cores of a salient pole type, rotor windings wound on such plurality of rotor cores connected parallelly with a diode being connected between the terminals of the rotor windings and further a squirrel-cage type rotor conductive members provided on peripheries of the salient pole type rotor cores, the voltage phase shifting means functions such that, at the starting operation, all of the rotating magnetic fields produced by a plurality of stators are caused to be of the same phase whereby a circulating current flows through the rotor windings wound on the rotor cores due to the rotating magnetic fields and the current also flows to the squirrel cage type conductor for the starting operation. During the synchronous operation, the phase of the rotating magnetic field produced by the particular stator is shifted 180° thereby causing to cease the flow of the circulating current at the rotor windings wound on the salient pole type rotor cores and the current at the squirrel-cage rotor conductive members. Here, the direct current magnetic excitation circuit provided on the stators can operate causing the generation of an alternating voltage at the rotor windings wound on the salient pole type rotor cores due to the static magnetic field of the direct current magnetic excitation circuit so that the rectified current flows through the diode connected between the terminals of the rotor windings. This rectified current effects DC magnetic excitation of the rotor windings thereby making a synchronous operation possible.

Also, as explained above, here too, in place of the direct current magnetic excitation circuit of the stator, there are provided a revolving armature having a rectifier circuit directly mounted on the rotary axis and a stator for the direct current magnetic excitation surroundingly facing the revolving armature whereby direct current outputs of the rectifier circuit are connected parallelly with the rotor windings wound on the rotor cores and a synchronous operation is made possible by the DC magnetic excitation of the rotor windings.

It is also possible to produce a static magnetic field and this is achieved by an arrangement wherein the direct current magnetic excitation circuit explained above utilizes one phase of the stator windings and a circuit in which a thyristor and a diode connected with their polarities inverted is connected to that one phase of the stator windings. Here, the firing angle of the thyristor is changed allowing the direct current component to flow to the stator windings.

As to the voltage phase shifting means, the inventors in the present patent application have disclosed in Japanese Patent Application No. Sho 61-128,314 two systems, one by which a position of a stator is changed by having the stator mechanically rotated about its rotary axis and the other by which the connections of stator windings are changed by means of switching.

As explained above, the present invention provides a synchronous motor which generates a large starting torque and a large synchronous torque and in which, the motor does not require brushes, the maintenance and inspection is easy and the motor is structurally simple as it does not require such means as a starter.

The power source for magnetically exciting the stator windings can be an alternate current source of commercial frequency or a variable frequency power source utilizing an invertor. When the variable frequency power source is used, the change of synchronous speeds is facilitated and even in such a case the motor can be started by a starting torque as in an ordinary induction motor. Thus, the motor according to the present invention is not only economical but also is opened to a wide variety of uses.

BRIEF EXPLANATION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
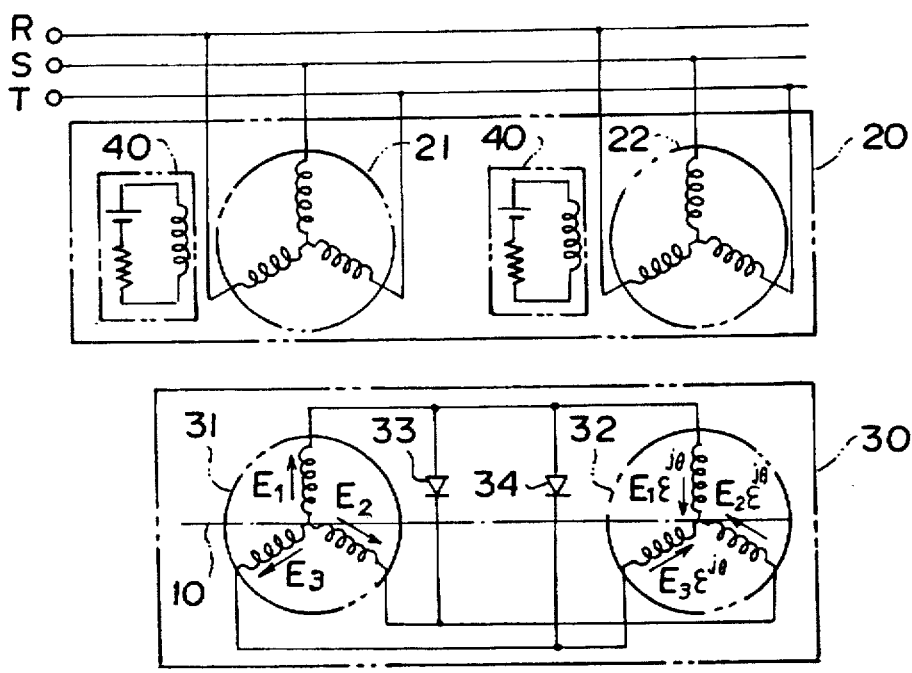
FIG. 1 shows a first embodiment according to the invention.

The present invention will be explained with reference to a two-stator induction synchronous motor as a main constituent feature but of course the invention is not limited thereto. As to the connections of the stator windings, they may be any of parallel, series, star and delta connections. The inventors in the present patent application have already disclosed in Japanese Patent Application No. 61-128,314 the structure and function of the induction motor having a plurality of stators, which may be used as an element in the motor according to the present invention. For example, a disclosure is found therein that, if the phase difference effected by the voltage phase shifting means between a rotating magnetic field produced around the rotor surroundingly faced by the particular one of the stators and a rotating magnetic field produced around the other rotor surroundingly faced by the other stator is of the same phase or zero in an electric angle, the current which flows in the rotor conductor circulates in the rotor conductive members or so that, if such electrical angle is 180°, the current to flow to the rotor conductor through connecting members connecting the rotor conductive members of the rotor cores.

As to the voltage phase shifting means, the above application discloses an arrangement wherein stators are relatively rotated or wherein the connections of stator windings are switched. The present invention relies on the former arrangement but according to the present invention the switching from the electrical angle 0° to 180° can be instantaneously effected and the motor can easily enter into a synchronous operation. An arrangement for automating such synchronous operation may be realized if the arrangement includes a sensing means for detecting rotation speeds and a control means connected to such sensing means for the direct current magnetic excitation circuit and the voltage phase shifting means. In the motor thus arranged, even when a step-out occurs in the motor, it will be possible to make an instantaneous change from the synchronous operation to the induction motor operation based on a signal from the sensing means so that, unlike in an ordinary induction motor, the motor does not stop suddenly and immediately following the step-out, which helps avoiding such accidents as may be caused by such sudden stop.

A first embodiment according to the present invention is explained with reference to FIG. 1. The numeral 20 shows the stator side of an induction synchronous motor having two stators and the numeral 30 likewise shows the rotor side of the same.

At the stator side 20 of the motor, two stator windings 21, 22 which are star-connected are coupled parallelly to a three-phase alternating power sources R, S and T. At the stator side 20 there are provided direct current excitation windings 40 of an excitation circuit which are separate from stator windings 21, 22. At the rotor side 30, rotor windings 31, 32 wound on rotor cores provided coaxially with the rotor axis 10 are parallelly connected with each other with diodes 33, 34 being connected between two terminals of the rotor windings 31, 32. Here, it is assumed that the voltages induced in the rotor winding 31 surroundingly facing the stator winding 21 are $E_1$, $E_2$ and $E_3$ and the voltages induced in the rotor winding 32 surroundingly facing the stator winding 22 are $E_1e^{j\theta}$, $E_2e^{j\theta}$ and $E_3e^{j\theta}$. Here a phase difference angle of the voltages is represented by $\theta$.

Figure 12:
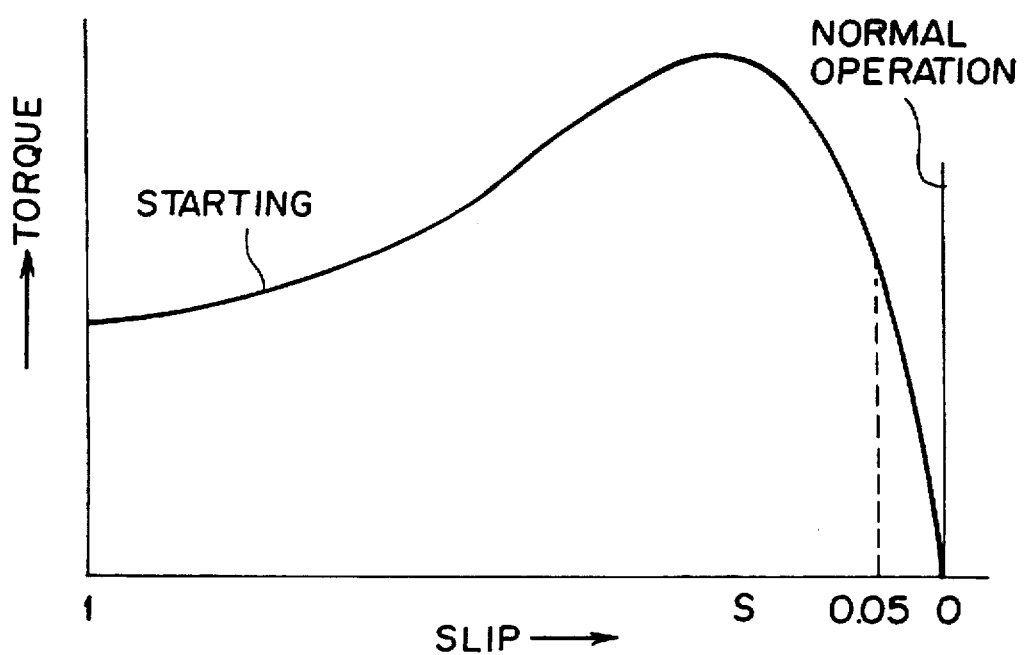
FIG. 12 shows a typical torque characteristic curve obtained by the synchronous motor according to the invention.

Next, the operation of the above arrangement is explained. At the starting of the motor, the power is switched on in the state in which the stator windings 21, 22 are connected with each other so that the phase difference angle $\theta$ may become $\theta=0°$. Then, a three-phase current from the power source flows to the stator windings 21, 22 thereby generating rotating magnetic fields respectively of the same phase and inducing the voltage at the rotary windings 31, 32. Since the phase difference angle is $\theta=0°$, the current which flows to the rotor windings flows circulating from the rotor winding 31 to the rotor winding 32 and no current flows to the diodes 33, 34 which are connected between the terminals of the rotor windings. Thus, as shown in FIG. 12, the motor starts with the same starting torque characteristics as in a conventional induction motor in which the starting torque is large without requiring any special separate means as a starter. After the motor starts and as the rotation speed of the rotor accelerates and approaches the speed of the rotating magnetic field, that is, the synchronous speed, the induction voltages $E_1$, $E_2$ and $E_3$ become small since the slip S involved becomes small. So far the operation relates all to the operation as an induction motor, but as the slip S approaches S=0.05 the motor enters into the synchronous operation. How this is effected is explained hereinafter.

First, the position of one of the two stator windings 21, 22, for example, the stator winding 22, is changed by a voltage phase changing means such that the stator core concerned is rotated about the rotary axis and that the phase difference angle between the two rotating magnetic fields generated by the two stator windings 21, 22 may become 180°. The current which has been flowing due to the rotating magnetic fields from the rotor winding 31 to the rotor winding 32 no longer circulates but flows through the diodes 33, 34 connected between the terminals of the rotor windings 31, 32. That is, the current rectified through the diodes 33, 34 flows in the rotor windings 31, 32. The rectified current flowing to the rotor windings due to the rotating magnetic fields no longer flows therethrough when the rotating speed of the rotor reaches the synchronous speed resulting in the slip being S=0 and there can be no synchronous operation. It is at this point when a direct current excitation winding 40 starts to act to itself. That is, when the direct current flows to the direct current excitation windings 40 thereby forming static magnetic fields, the rotor windings 31, 32 interlink with the static magnetic fields and induce an alternating voltage. This alternating voltage based on the static magnetic fields becomes larger as the rotor increases its speed. As to the phase difference of the alternating voltage due to the static magnetic fields, since the direct current excitation windings 40 are interlocked with the phase shifting means, the phase difference angle θ of the alternating voltage due to the static magnetic fields induced by the two rotor windings 31, 32 is θ=180°. Thus, the diodes 33, 34 connected between the terminals of the rotor windings rectify the alternating voltage and the current thus rectified flows in the rotor windings 31, 32, whereby the rotor cores form magnetic poles and the unitary rotor starts a synchronous speed operation with the unitary rotor being attracted by the rotating magnetic fields produced by the stator windings 21, 22. The synchronous torque characteristics under this state are also shown in FIG. 12. Since the synchronous torque is proportional to the strength of the static magnetic field, it is possible to obtain a large synchronous torque. Here, some further consideration will be given to the synchronous torque. During the synchronous operation, the phase of the rotating magnetic field produced in the stator winding 22 by the voltage phase shifting means is shifted 180° with respect to that of the stator winding 21 and also the phase of the alternating voltage induced in the rotor winding 32 by the static magnetic fields is shifted 180° with respect to that of the rotor winding 31. Since the rectified current flows in the direction in which there is no circulation of the current, that is, the flow is from the respective rotor windings and through the respective diodes 33, 34, the synchronous torque takes the same direction in the two rotors resulting in the added torque so that, although there are two stators in the present induction synchronous motor, the total capacity of the motor is no less than that of a conventional synchronous motor having brushes.

As explained above, the induction synchronous motor having a plurality of rotors according to the present invention has a large starting torque since the starting takes place based on the same principle as in a conventional induction motor so that no special starter is required.

Further, during the synchronous speed operation, the rotor windings function as direct current excitation windings, i.e., field system windings, and this enables providing a synchronous motor which has a large synchronous torque but does not require extra maintenance such as that for brushes.

With respect to the present embodiment according to the invention, the means by which the core of one of the stators is rotated has been described as the voltage phase shifting means for providing a phase difference to the induction voltage of the rotor windings. However, it is also possible to effect a change in the phase difference angle θ, that is from θ=0° to θ=180°, by an electrical means wherein a change is made In the connections of the stator windings, that is, the two terminals of the stator windings are exchanged with each other.

Also, in the present embodiment, use is made of a commercial power source as a power supply source, it is possible to use a variable frequency power source such as an invertor, which enables a motor to operate at a desired synchronous speed.

Figure 2:
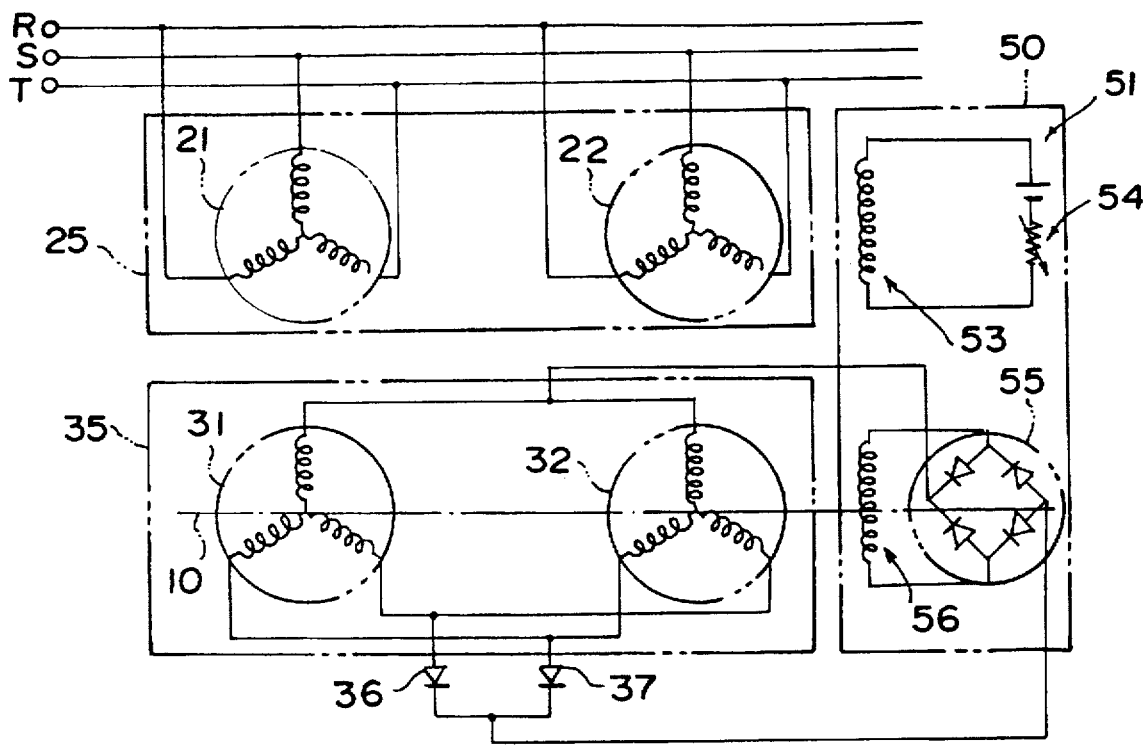
FIG. 2 shows a second embodiment according to the invention.

Next, a second embodiment according to the present invention is explained with reference to FIG. 2.

The main difference in this embodiment from the first embodiment resides in the means related to the direct current magnetic excitation of the rotor windings which is necessary in the synchronous operation. In the rotary axis 10, there is directly connected an alternate current generator of a revolving armature type having an armature winding 56 whose output voltage is rectified by a rectifying circuit 55. Direct current output terminals of the rectifying circuit 55 are connected parallelly to the rotor windings 31, 32, which are parallelly connected with each other, through the diodes 33, 34. During the synchronous operation of the motor, a stator side 51 of the alternate current generator 50 allows a direct current to flow from a direct current source 54 to a direct current magnetic excitation winding 53 whereby an alternating voltage is induced in the armature winding 56 and the rectified direct current is shunted to the rotor windings 31, 32. In this manner, the rotor windings 31, 32 are DC-excited and act with the rotating magnetic fields produced by the stator windings 21, 22 so as to achieve a synchronous operation of the motor.

By employing the means as explained above, the current flowing in the rotor windings 31, 32 can be subjected to full wave rectification, which is advantageous as a synchronous torque can be made larger as compared with the first embodiment in which the same is subjected to half wave rectification.

Now, a third embodiment according to the present invention is explained with reference to FIGS. 3 and 4.

The point different in this embodiment from the first embodiment resides in a different arrangement at the rotor side 60.

Figure 3:
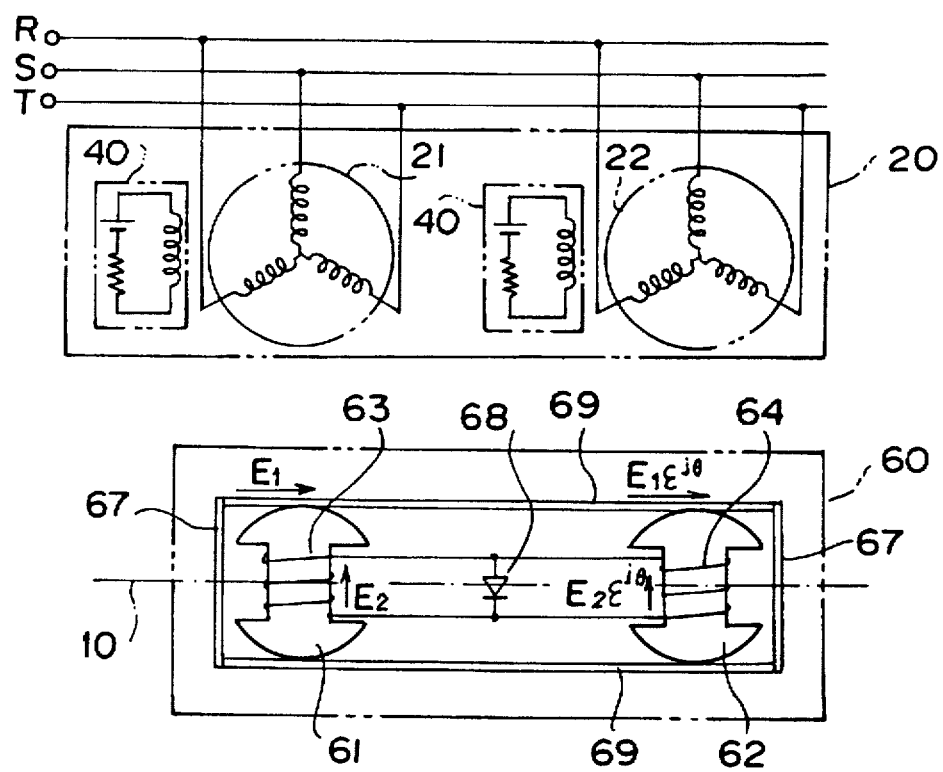
FIG. 3 shows a third embodiment according to the invention.

As shown in FIG. 3, in a squirrel-cage type conductor 69, rotor windings 63, 64 wound on two salient-pole type rotor cores 61, 62 provided on a common rotary axis 10 of the rotor side 60 are connected with each other parallelly and diode 68 is connected between terminals of the rotor windings 63, 64. Further, as noted from FIG. 4 which shows a sectional view of the unitary rotor, a plurality of rotor conductive members 66 mounted on peripheries of the salient-pole type rotor cores 61, 62 are connected directly with each other from one end through the other. The conductive members 66 are provided at each end thereof with a short-circuitting ring 67 for short-circuitting a plurality of conductive members 66.

Figure 4:
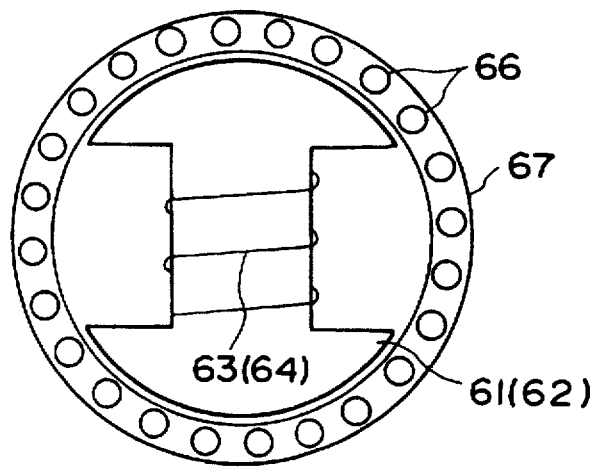
FIG. 4 shows an elevational view of the rotor of the third embodiment shown in FIG. 3.

In FIGS. 3 and 4, each of the salient pole rotor cores is shown as having two poles but, of course, this is not limited to such two poles. It is assumed that the voltage induced in the squirrel conductive members 69 surroundingly facing the stator winding 21 is in the direction $E_1$ as shown by an arrow in the drawings and also the voltage inducted in the rotor winding 63 is in the direction $E_2$ as shown by an arrow in the drawings. It is also assumed that the voltage inducted in the squirrel cage type conductive members 69 surroundingly facing the stator winding 22 is in the direction $E_1 e^{j\theta}$ as shown in the drawings and the voltage induced in the rotor winding 64 is also in the direction of $E_2 e^{j\theta}$. Here, θ is a phase difference angle of the voltage.

The operation of the motor as arranged above is as follows:

For starting, the motor is switched on in the state in which the stator windings 21, 22 are connected with each other so that the squirrel cage type conductive members 69 and the rotor windings 63, 64 assume a phase difference angle of θ=0°. In this state, three-phase currents flow from power sources to the stator windings 61, 62, thereby producing respective rotating magnetic fields of the same phase and inducing the voltages in the squirrel cage type conductor 69 and the rotor windings 63, 64. Here, since the phase difference angle of the induction voltages is θ=0°, the current flows circulating to the conductive members through the short-circuitting rings at the two ends of the squirrel cage type conductor. Also, the current to flow in the rotor windings flows so as to circulate from the rotor windings 63 to the rotor winding 64. Thus, no current flows to a diode 68 connected between the terminals of the rotor windings 63, 64.

Under the above state, the starting torque is of a combination of torque characteristics of the induction motor with the squirrel-cage type conductor 69 and torque characteristics of the induction motor with the rotor windings 63, 64, resulting in a large starting torque.

Next, as the rotating speed increases after the starting of the motor and approaches the synchronous speed, the slip S decreases whereby the induction voltage $E_1$ of the squirrel-cage type conductor assembly 69 and the induction voltage $E_2$ of the rotor windings 63, 64 become small.

The operation so far is that as the induction motor but the motor enters into its synchronous operation when the slip S approaches S=0.05. As already explained with reference to the first embodiment, it is by the phase shifting means that a phase difference angle of the two rotating magnetic fields produced in the two stator windings 21, 22 is changed to 180°. In this manner, the phase difference angle θ of the induction voltage of the squirrel cage type conductor assembly 69 and the rotor windings 63, 64 will become θ=180°.

Thus, the total E of the induction voltage due to the rotating magnetic field of the squirrel-cage type conductor 69 will be:

$$E=E_1+E_1 e^{j180°}=E_1-E_1=0$$

so that there will be no current flow to the squirrel-cage type conductor 69.

The current due to the rotating magnetic fields which has been flowing circulating to the rotor winding 64 from the rotor winding 63 no longer flows and the current rectified through the diode 68 connected between the terminals of the rotor windings now flows to the rotor windings 63, 64. Thus, the motor loses it function as an induction motor.

Here, as was the case for the first embodiment, the direct current magnetic excitation winding 40 provided on the stator starts to function. That is, when the static magnetic field is produced due to the direct current magnetic excitation winding, the squirrel cage type conductor 69 and the rotor windings 63, 64 interlink with the static magnetic field and induce an alternating voltage. The phase of the alternating voltage due to the static magnetic field is interlocked with the voltage phase shifting means so that the phase difference angle θ of the alternating voltage due to the static magnetic field induced in the squirrel-cage type conductor 69 and the rotor windings 63, 64 becomes θ=180°. Consequently, no current flows to the squirrel-cage type conductor 69 and the current which is rectified through the diode 68 connected between the terminals of the rotor windings 63, 64 due to the alternating voltage by the static magnetic field flows to the rotor windings 63, 64. Here, the rotor cores 61, 62 form magnetic poles whereby the unitary rotor is attracted by the rotating magnetic fields produced in the stator windings 21, 22 and starts its synchronous rotation. Thus, it is possible for the motor to incorporate therein a salient pole type arrangement to enjoy characteristics inherently deriving therefrom.

Figure 5:
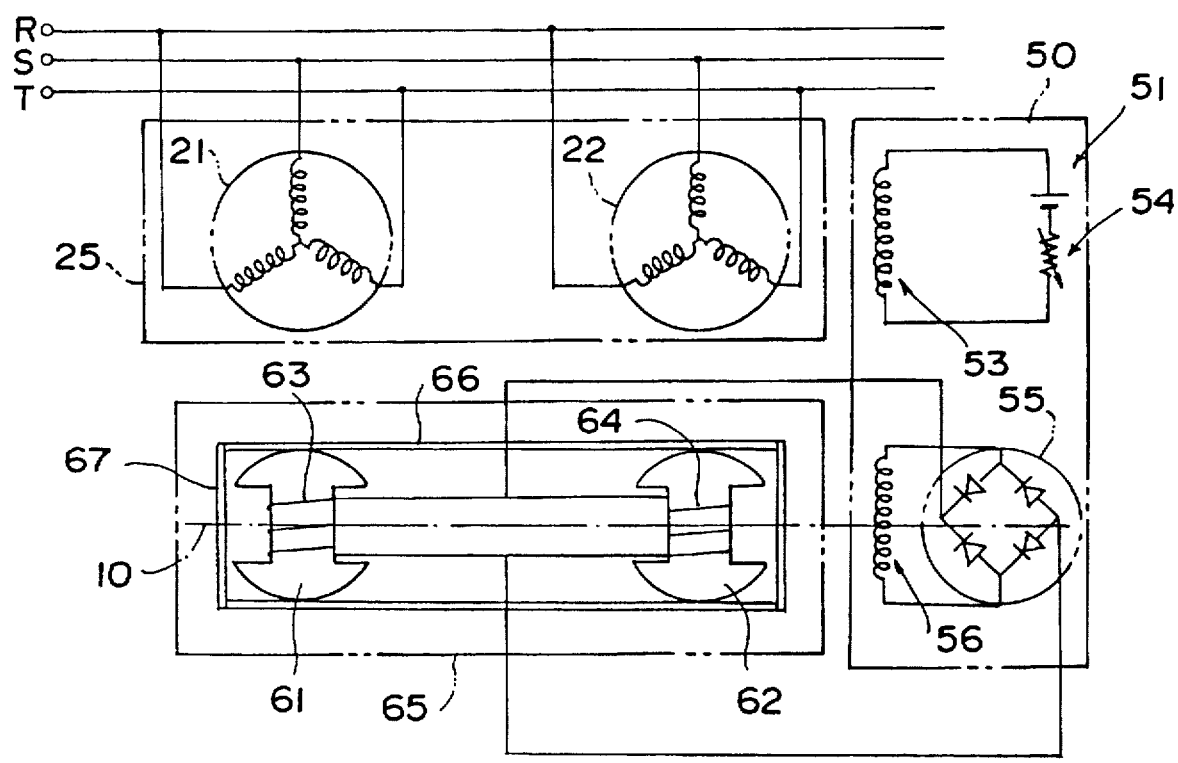
FIG. 5 shows a fourth embodiment according to the invention.

Next, a fourth embodiment according to the present invention is explained with reference to FIG. 5.

The point different from the above third embodiment relates to a system of direct current magnetic excitation of the rotor windings which is necessary during the synchronous operation. As shown in FIG. 5, a revolving armature type alternate current generator 50 is directly connected to a rotary axis 10 and an output voltage of its armature winding 56 is rectified by the rectifying circuit 55 and direct current output terminals thereof are parallelly connected to rotor windings 63, 64 connected in parallel with each other. During the synchronous operation of the motor, a stator side 51 of the revolving armature type alternate current generator 50 allows a direct current to flow from the direct current source 54 to the direct current magnetic excitation windings 53 whereby an alternating voltage is induced in the armature winding 56 and the rectified direct current is shunted to the rotor windings 63, 64. In this manner, the rotor windings 63, 64 are DC-excited and act with the rotating magnetic fields produced by the stator windings 21, 22 so as to achieve a synchronous operation of the motor.

By employing the means as explained above, the current flowing in the rotor windings 63, 64 can be subjected to full wave rectification, which is advantageous as a synchronous torque can be made larger as compared with the third embodiment in which the same is subjected to half wave rectification.

Figure 7:
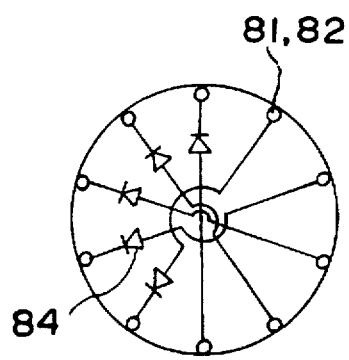
FIG. 7 shows an example illustrating the connections between the diodes and the rotor conductive members in the fifth embodiment shown in FIG. 6.
Figure 8:
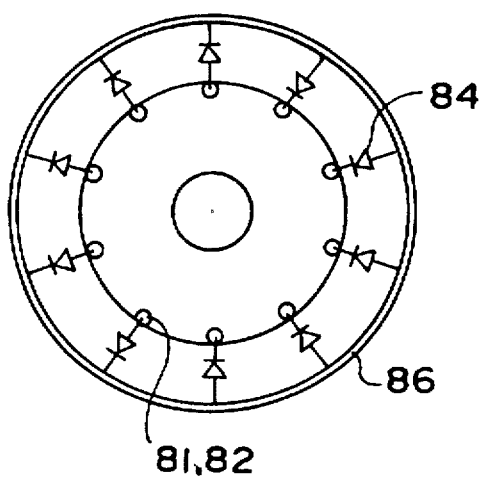
FIG. 8 shows another example illustrating the connections between the diodes and the rotor conductive members in the same embodiment.

Next, a fifth embodiment of the induction synchronous motor according to the invention which has a squirrel-cage type rotor assembly will be explained with reference to FIGS. 6 through 8.

A plurality of rotor conductive members 81, 82 extending through the two rotor cores are mounted on a common rotary axis 10 at the rotor side 80 and a short-circuitting ring 87 is provided at each end thereby forming a squirrel-cage type rotor assembly. The conductive members 81, 82 located with the phase difference between them being 180° in an electric angle are connected with each other, as shown in FIG. 7, through diodes 84 at the portion 88 where the rotor cores are not facing the stator cores. Alternatively, as shown in FIG. 8, the connection by the diodes may be made such that the respective conductive members located with the phase difference between them being 180° be connected with each other through a connecting ring 86. FIGS. 7 and 8 show examples wherein there are two poles but of course the number of poles is not limited thereto. The operation of the motor according to this embodiment is same as that of the embodiment explained above so that, when the phase difference produced by the voltage phase shifting means is 0°, the current circulates in the rotor conductive members 81, 82 and the motor starts as an ordinary induction motor and, when the phase difference is shifted to 180° thereafter, the current flows through the diodes 81, 82 and the magnetic poles are formed in the rotor cores whereby the motor enters into a synchronous operation.

Figure 9:
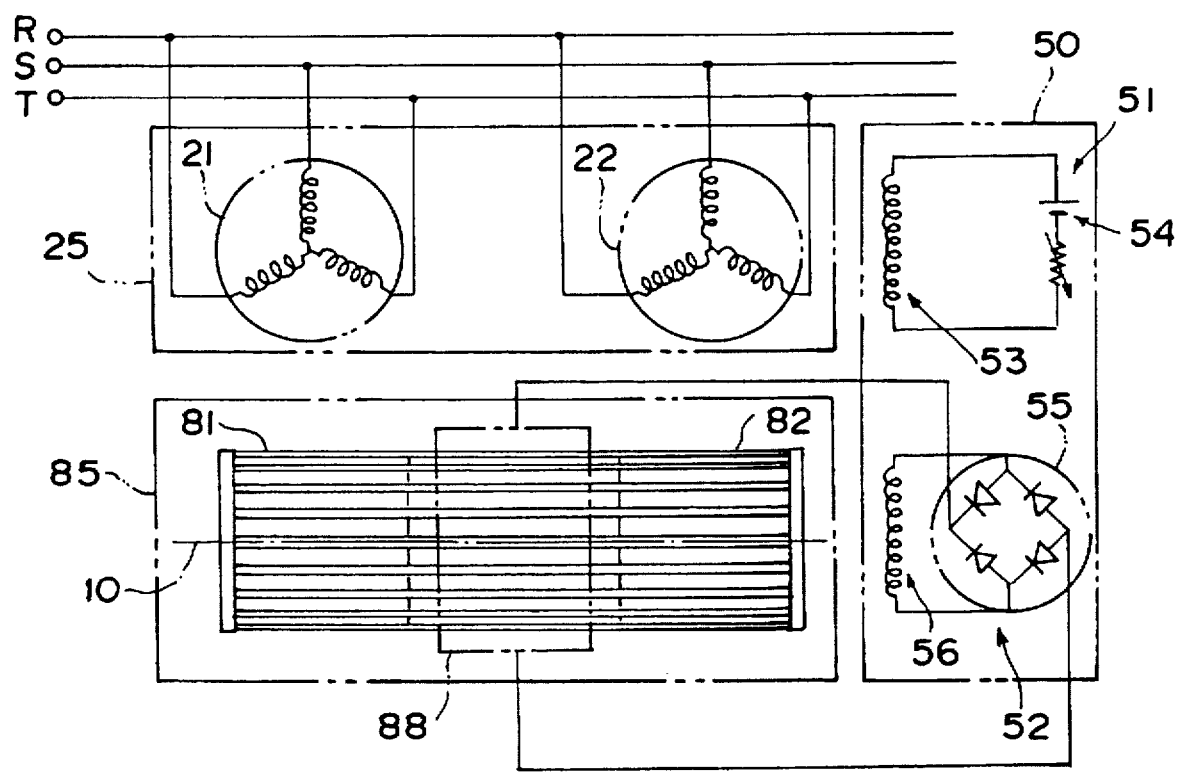
FIG. 9 shows sixth embodiment according to the invention.
Figure 10:
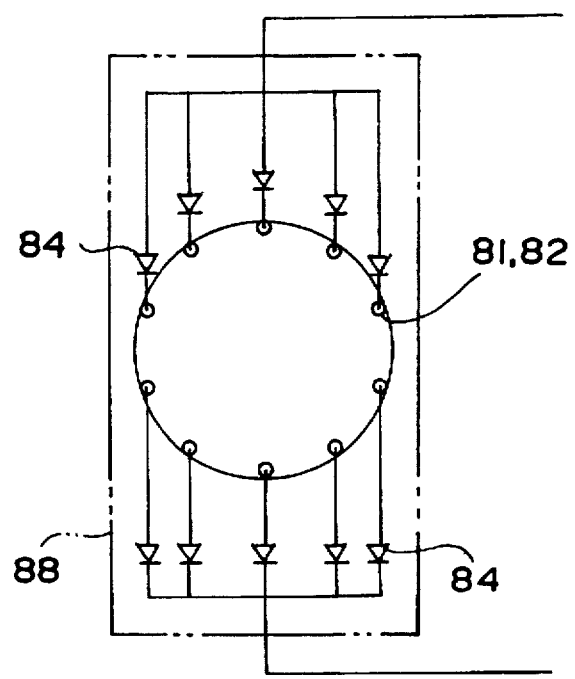
FIG. 10 shows the way of connections between the rectifier circuit and the rotor conductive members through diodes.

FIG. 9 and FIG. 10 show another embodiment, according to the present invention, of the DC magnetic excitation means for the rotor conductive members 81, 82.

In the motor of this embodiment, a revolving armature type AC generator 50 is directly mounted on a rotary axis 10, the output voltage of the armature windings 56 of the generator is rectified by a rectifier circuit 55, the direct current output terminals are connected, in parallel, through diodes 84 between the respective conductive members located with the phase difference therebetween being 180°. This connection is made at the portion 88 at which the conductive members extending through the rotor cores are not faced by the stators. FIG. 10 illustrates the ways in which such connections are made. That is, the positive output terminal of the rectifier circuit 55 is connected to the rotor conductive members through the diode 84 and the negative output terminal thereof is connected through the diode 84 to the rotor conductive members located with the phase difference of 180° in an electric angle from that of the former rotor conductive members. The remaining conductive members are arranged in the same way, so that the same number of magnetic poles as the number of poles in the stators is formed in the rotor by the direct current from the rectifier circuit 55. The drawings shows only the two pole example but the number of poles is not limited thereto.

Figure 11:
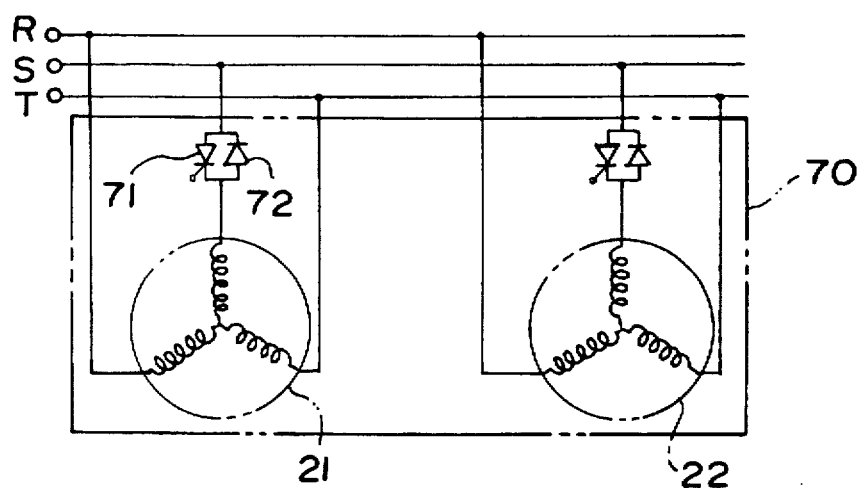
FIG. 11 shows another example of the static magnetic field producing means.

FIG. 11 shows a direct current excitation circuit 70 as an embodiment separate from that in the first, third and fifth embodiments.

Figure 6:
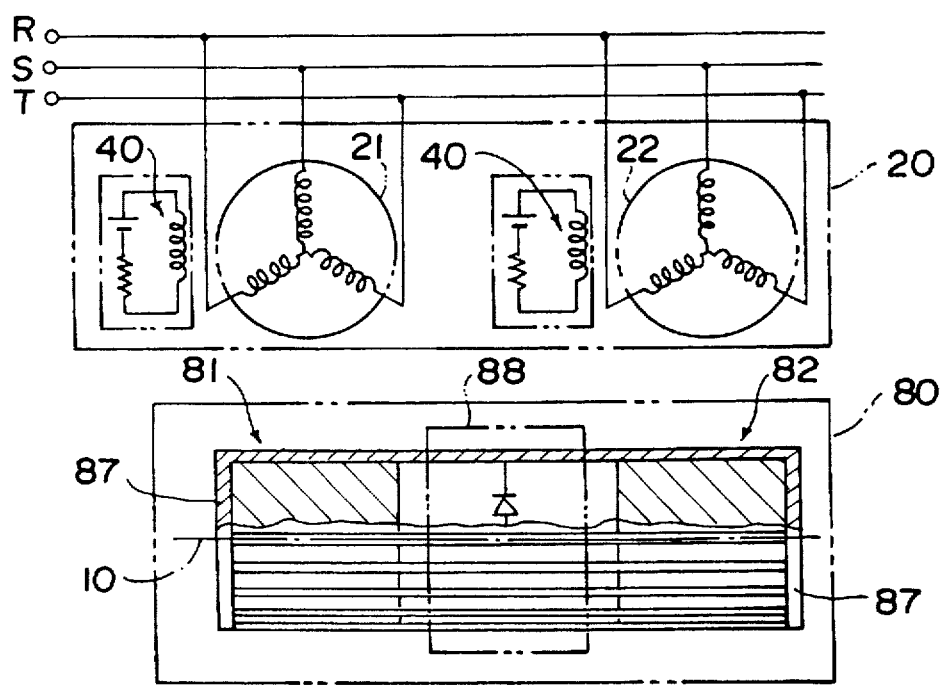
FIG. 6 shows a fifth embodiment according to the invention.

The point different in this embodiment from the first, third and fifth embodiments is that the direct current magnetic excitation winding 40 shown in FIGS. 1, 3 and 6 is omitted and a part of the stator windings is used in its place. Specifically, as shown in FIG. 11, in one phase of stator windings 21, 22 is inserted a circuit in which a thyristor 71 and a diode 72 are connected parallelly with their polarities inverted. This operates when the static magnetic field is produced, which are necessary in effecting the synchronous operation as already explained in connection with the first, third and fifth embodiments. That is, when the firing angle of the thyristor 71 is made larger than 0°, the current containing a direct current component due to the diode 72 flows to the stator windings 21, 22, whereby it is possible to produce the static magnetic fields. Thus, there is no necessity of providing separately a direct current magnetic excitation winding in addition to the stator windings 21, 22 and this facilitates simplifying the structure of the motor.

However, in the above arrangement, since the rotating magnetic field produced by the stator windings 21, 22 distorts itself, the synchronous torque is produced by the positive phase component magnetic field from a method of symmetrical co-ordinates. Other functions in this embodiment are the same as those in the first, third and fifth embodiments.

Figure 13:
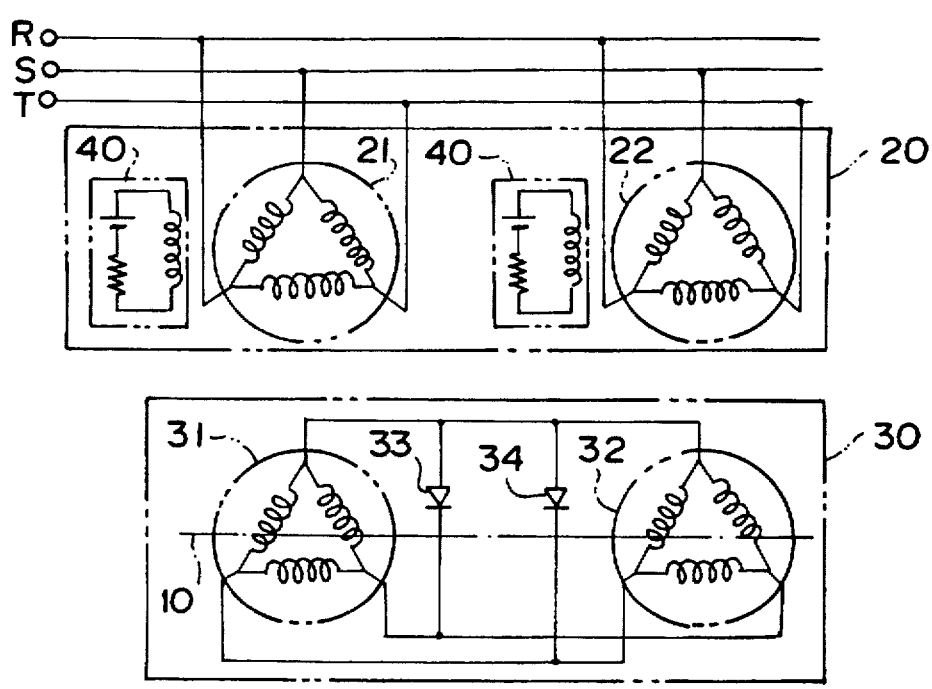
FIG. 13 shows an example in which the stator windings and the rotor windings are respectively connected in the delta-form.

Though the drawings only show the star-connections of the stator windings and the rotor windings, it is needless to say that the delta-connections may be adopted as shown in FIG. 13.

The induction synchronous motor having been arranged as above and having a plurality of stators according to the present invention starts its operation as an induction motor at the start of the motor and performs its operation as a synchronous motor once its rotation approaches a synchronous speed, that is, when the slip S reaches near S=0.05. That is, at the start of the motor, the motor can start in the same way as an ordinary induction motor. Thus, the motor does not require such a starter as required in an ordinary synchronous motor. Now, it is assumed that the rotation speed of the rotor approaches the synchronous speed and the slip S reaches near S=0.05. The DC component current through the thyristor or diode flows to the stator side and the mechanical position of one of a plurality of the stators is changed by the relative rotation of the stators or the connection of the stator windings is switched, whereby the phase difference is established in the rotating magnetic fields produced around the stator cores surroundingly facing the plurality of rotor cores. The voltage is induced in the rotor windings or conductive members due to the static magnetic field produced by the direct current component at the stator side whereby the current flows to the circuit connected between the rotor winding or rotor conductive members and, due to the function of this circuit, that is, due to the function of generating the direct current component, there are produced magnetic poles in the unitary rotor. These magnetic poles and the rotating magnetic fields attract with each other resulting in the synchronous speed rotation of the rotors.

As explained above, the present invention provides an induction synchronous motor which starts with the characteristics of an induction motor and, after the characteristics being changed to those of a synchronous motor when the slip approaches, for example, 0.05, operates in a synchronous speed. The induction synchronous motor having a plurality of stators according to the invention is with a structure which does not require any starter or brushes and such structure is so simple that the motor is almost the same as an induction motor itself. The characteristics of an induction motor remain so that the torque characteristics at the motor starting are naturally the same as those in the induction motor. Therefore, it is possible for the motor to start as an induction motor even when the motor is loaded.

As clear from the forgoing, since the motor according to the present invention has the torque characteristics of both those as an induction motor and those as a synchronous motor, the motor can be used with both the characteristics being enjoyed. For example, when there occurs a step-out in the motor for some reasons during its operation, the torque characteristics may simply be changed from those of a synchronous motor to those of an induction motor thereby, unlike in an ordinary synchronous motor, a sudden stop of the motor can be avoided.

In an ordinary synchronous motor, when a heavy load is applied and an excess current flows, the motor may need to be stopped in order to avoid the heating and damaging of the motor, in which case the rotation of the motor suddenly ceases. However, in the synchronous motor according to the present invention, it is possible to effect the stopping by first having its operation changed to that as an induction motor.

Thus, the present invention can provide a synchronous motor which is simple in its structure and easy in its maintenance and in which the utility as an induction motor fully remains.

We claim:

1. An induction synchronous motor comprising:

a unitary rotor having a first and a second rotor core mounted on a common rotary axis with a predetermined space being provided between said first and second rotor cores and a plurality of rotor conductive members provided on each of said first and second rotor cores;

a first and a second stator mounted surroundingly facing said first and the second rotor core, respectively;

a voltage phase shifting means for producing a second phase of 180° with respect to a first phase difference of 0° in an electric angle between a voltage induced in said rotor conductive member based on a rotating magnetic field produced around said first rotor core surroundingly faced by said first stator and a voltage induced in said rotor conductive member based on a rotating magnetic field produced around said second rotor core surroundingly faced by said second stator;

a static magnetic field producing means for producing a static magnetic field around each of said first and second rotor cores; and a rotor magnetizing means formed in a unit with said rotor and having diodes for rectifying alternating voltages induced based on said static magnetic field produced by said static magnetic field producing means, the resultant direct current being caused to flow in each of said rotor conductive members to produce magnetic poles in said first and second rotor cores;

whereby the motor is caused to initiate its operation as an induction motor based on said first phase difference produced by said voltage phase shifting means, to have said first phase difference shifted to said second phase difference produced by said phase shifting means, to have said static magnetic field producing means operated, and to have said first and second rotor cores produce the magnetic poles attracted by the rotating magnetic fields produced by said first and second stators, resulting in the synchronous operation of the motor.

2. An induction synchronous motor having a plurality of stators comprising:

a unitary rotor having rotor windings connected parallelly with respective rotor windings wound on a plurality of rotor cores provided on a common rotary axis with a predetermined space between said rotor cores;

a plurality of stators surroundingly facing said rotor cores respectively;

a voltage phase shifting means for producing a phase difference between a voltage induced based on a rotating magnetic field produced around one of the rotor cores surroundingly faced by a particular one of said plurality of stators and a voltage induced based on a rotating magnetic field produced around the other of the rotor cores surroundingly faced by the other one of the stators;

a revolving armature type generator comprising a revolving armature having a rectifier circuit directly mounted to said rotary axis and a stator for the direct current magnetic excitation disposed facing said revolving armature; and diodes through which a direct current output of said rectifier circuit of said revolving armature is connected parallelly with said rotor windings wound on said plurality of rotor cores.

3. An induction synchronous motor having a plurality of stators comprising:

a unitary rotor having rotor windings connected parallelly with respective rotor windings wound on a plurality of salient pole type rotor cores provided on a common rotary axis with a predetermined space between said rotor cores, having a diode connected between terminals of said rotor windings, having a plurality of conductive members provided on peripheries of said plurality of salient pole type rotor cores, and having short-circuitting rings each provided at each end of said conductive members for short-circuiting said conductive members respectively therethrough;

a plurality of stators each surroundingly facing each of said salient pole type rotor cores;

a voltage phase shifting means for producing a phase difference between a voltage induced based a rotating magnetic field produced around one of the salient pole type rotor cores surroundingly faced by a particular one of said plurality of stators and a voltage induced based on a rotating magnetic field produced around the other of the salient pole type rotor cores surroundingly faced by the other one of the stators; and a static magnetic field producing means for producing a static magnetic field around each of said salient pole type rotor cores.

4. An induction synchronous motor having a plurality of stators comprising:

a unitary rotor having rotor windings connected parallelly with respective rotor windings wound on a plurality of salient pole type rotor cores provided on a common rotary axis with a predetermined space between said rotor cores, having a plurality of conductive members provided on peripheries of said plurality of salient pole type rotor cores, and having short-circuitting rings each provided at each end of said conductive members for short-circuitting said conductive members respectively therethrough;

a plurality of stators each surroundingly facing each of said salient pole type rotor cores;

a voltage phase shifting means for producing a phase difference between a voltage induced based on a rotating magnetic field produced around one of the salient pole type rotor cores surroundingly faced by a particular one of said plurality of stators and a voltage induced based on a rotating magnetic field produced around the other of the salient pole type rotor cores surroundingly faced by the other one of the stators; and a revolving armature type generator comprising a revolving armature having a rectifier circuit directly mounted to said rotary axis and a stator for the direct current magnetic excitation disposed facing said revolving armature;

wherein direct current outputs of said rectifier circuit of said revolving armature are connected parallelly with said rotor windings wound on said plurality of salient pole type rotor cores.

5. An induction synchronous motor having a plurality of stators comprising:

a unitary squirrel-cage type rotor having a plurality of rotor cores mounted on a common axis with a predetermined space being provided between said rotor cores and a plurality of rotor conductive members mounted on said rotor cores with both the ends being short-circuitted;

a plurality of stators surroundingly facing said rotor cores respectively;

a plurality of diodes through which said conductive members located with a phase difference being 180° in an electric angle are connected with each other at the portion where said stators are not faced by said conductive members;

a voltage phase shifting means for producing a phase difference between a voltage induced based a rotating magnetic field produced around one of said rotor cores surroundingly faced by a particular one of said plurality of stators and a voltage induced based on a rotating magnetic field produced around the other of said cores surroundingly faced by the other one of the stators; and a static magnetic field producing means for producing a static magnetic field around each of said rotor cores.

6. An induction synchronous motor having a plurality of stators comprising:

a unitary squirrel-cage type rotor having a plurality of rotor cores mounted on a common rotary axis with a predetermined space being provided between said rotor cores and a plurality of rotor conductive members mounted on said rotor cores with both the ends being short-circuitted;

a plurality of stators surroundingly facing said rotor cores respectively;

a voltage phase shifting means for producing a phase difference between a voltage induced based a rotating magnetic field produced around one of said rotor cores surroundingly faced by a particular one of said plurality of stators and a voltage induced based on a rotating magnetic field produced around the other of said cores surroundingly faced by the other one of the stators;

a revolving armature type generator comprising a revolving armature having a rectifier circuit directly mounted to said rotary axis and a stator for the direct current magnetic excitation disposed facing said revolving armature; and a plurality of diodes through which outputs of said rectifier circuit of said revolving armature are connected, in parallel, to said rotor conductive members located with the phase difference being 180° in an electric angle between them at the portion where said stators are not faced by said rotor conductive members.

* * * * *